United States Patent
Nachenberg

(10) Patent No.: US 8,756,691 B2
(45) Date of Patent: Jun. 17, 2014

(54) IP-BASED BLOCKING OF MALWARE

(75) Inventor: Carey S. Nachenberg, Northridge, CA (US)

(73) Assignee: Symantec Corporation, Mountain View, CA (US)

( * ) Notice: Subject to any disclaimer, the term of this patent is extended or adjusted under 35 U.S.C. 154(b) by 215 days.

(21) Appl. No.: 12/943,705

(22) Filed: Nov. 10, 2010

(65) Prior Publication Data

US 2012/0117650 A1    May 10, 2012

(51) Int. Cl.
G06F 12/14    (2006.01)

(52) U.S. Cl.
USPC ............................. 726/24; 726/22

(58) Field of Classification Search
USPC .......................................... 726/24
See application file for complete search history.

(56) References Cited

U.S. PATENT DOCUMENTS

| | | | |
|---|---|---|---|
| 8,220,050 B2 * | 7/2012 | Sarathy | 726/22 |
| 2005/0076084 A1 | 4/2005 | Loughmiller et al. | |
| 2005/0091320 A1 * | 4/2005 | Kirsch et al. | 709/206 |
| 2005/0108569 A1 * | 5/2005 | Bantz et al. | 713/201 |
| 2006/0179113 A1 | 8/2006 | Buckingham et al. | |
| 2006/0218642 A1 * | 9/2006 | Kuppusamy et al. | 726/26 |
| 2008/0082658 A1 * | 4/2008 | Hsu et al. | 709/224 |
| 2008/0082662 A1 * | 4/2008 | Dandliker et al. | 709/225 |
| 2010/0037314 A1 * | 2/2010 | Perdisci et al. | 726/22 |
| 2010/0235915 A1 * | 9/2010 | Memon et al. | 726/23 |
| 2011/0083180 A1 * | 4/2011 | Mashevsky et al. | 726/23 |

FOREIGN PATENT DOCUMENTS

| | | |
|---|---|---|
| WO | WO 2004/081734 A2 | 9/2004 |
| WO | WO 2006/101758 A2 | 9/2006 |
| WO | WO 2007038283 A2 * | 4/2007 |

OTHER PUBLICATIONS

PCT International Search Report and Written Opinion, PCT Application No. PCT/US2011/059069, Feb. 10, 2012, 13 pages.
PCT Written Opinion of the International Preliminary Examining Authority, PCT Application No. PCT/US2011/059069, Oct. 17, 2012, 7 pages.

* cited by examiner

*Primary Examiner* — Joon H Hwang
*Assistant Examiner* — Johnny Aguiar
(74) *Attorney, Agent, or Firm* — Fenwick & West LLP

(57) ABSTRACT

A security module on a client monitors file download activities at the client and reports hosting website data to a security server. A download analysis module at the security server receives a hosting website data report from the client, where the hosting website data report describes a domain name and an IP address of a website hosting a file the client is attempting to download. The download analysis module analyzes the domain name and IP address of the website to generate file download control data indicating whether to allow downloading of the file to the client. The download analysis module reports the file download control data to the security module of the client. The security module uses the file download control data to selectively block downloading of the file.

9 Claims, 5 Drawing Sheets

IP-BASED BLOCKING OF MALWARE

BACKGROUND OF THE INVENTION

1. Field of the Invention

This invention pertains in general to computer security and in particular to the detection of malicious software downloads.

2. Description of the Related Art

There is a wide variety of malicious software (malware) that can attack modern computers. Malware threats include computer viruses, worms, Trojan horse programs, spyware, adware and crimeware. Modern malware is often designed to provide financial gain to the attacker. For example, malware can surreptitiously capture important information such as logins, passwords, bank account identifiers, and credit card numbers. Similarly, malware can provide hidden interfaces that allow the attacker to access and control the compromised computer.

Attackers often camouflage malware by making the malware appear to be legitimate. For example, malware attackers offer fake antivirus software applications at their websites. Unsuspecting users are tricked into downloading and executing the fake antivirus software, and then the malware contained therein gains control of the user's computer and attempts to perform malicious actions.

Security software can prevent malware infections by blocking downloads from websites hosted at known malicious domains. However, malware attackers defeat these security measures by frequently changing the domains from which the malware is distributed. For example, a malware attacker may change domains once per hour. Such frequent domain changing makes traditional domain-based blocking of malware downloads nearly impossible because legitimate security software vendors cannot keep up. There is thus an ongoing need for ways to keep users from downloading malware from malicious websites.

BRIEF SUMMARY

The above and other needs are met by methods, computer-readable storage media, and systems of detecting and blocking malicious software downloads.

One aspect provides a computer-implemented method for blocking a download of malware. Embodiments of the method comprises receiving a hosting website data report, where the hosting website data report describes a domain name and an Internet Protocol (IP) address of a website hosting a file a client is attempting to download. The method determines whether the domain name of the website is on a list of trusted domains. The method determines whether the IP address of the website is on a list of IP addresses from which clients have downloaded malware. The method further generates file download control data indicating to block downloading of the file responsive to determining that the domain name of the website is not on the list trusted domains and that the IP address of the website is on the list of IP addresses from which clients have downloaded malware. The method reports the file download control data to the client. The client is adapted to use the file download control data to selectively block downloading of the file.

Another aspect provides a non-transitory computer-readable storage medium storing executable computer program instructions for blocking a download of malware. The computer-readable storage medium stores computer program instructions for receiving a hosting website data report, where the hosting website data report describes a domain name and an IP address of a website hosting a file a client is attempting to download. The computer-readable storage medium further comprises computer program instructions for determining whether the domain name of the website is on a list of trusted domains. The computer-readable storage medium further comprises computer program instructions for determining whether the IP address of the website is on a list of IP addresses from which clients have downloaded malware. The computer-readable storage medium further comprises computer program instructions for generating of file download control data indicating to block downloading the file responsive to determining that the domain name of the website is not on the list trusted domains and that the IP address of the website is on the list of IP addresses from which clients have downloaded malware. The computer-readable storage medium further comprises computer program instructions for reporting the file download control data to the client. The client is adapted to use the file download control data to selectively block downloading of the file.

Still another aspect provides a computer system for blocking a download of malware. The system comprises a non-transitory computer-readable storage medium storing executable computer program modules including an evaluation module and a server interaction module. The evaluation module is for receiving a hosting website data report, where the hosting website data report describes a domain name and an IP address of a website hosting a file a client is attempting to download. The evaluation module is further for determining whether the IP address of the website is on a list of trusted domains. The evaluation module is further for determining whether the IP address of the website is on a list of IP addresses from which clients have downloaded malware. The evaluation module is further for generating file download control data indicating to block downloading of the file responsive to determining that the domain name of the website is not on the list trusted domains and that the IP address of the website is on the list of IP addresses from which clients have downloaded malware. The server interaction module is for reporting the file download control data to the client. The client is adapted to use the file download control data to selectively block downloading of the file.

The features and advantages described in this summary and the following detailed description are not all-inclusive. Many additional features and advantages will be apparent to one of ordinary skill in the art in view of the drawings, specification, and claims hereof.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
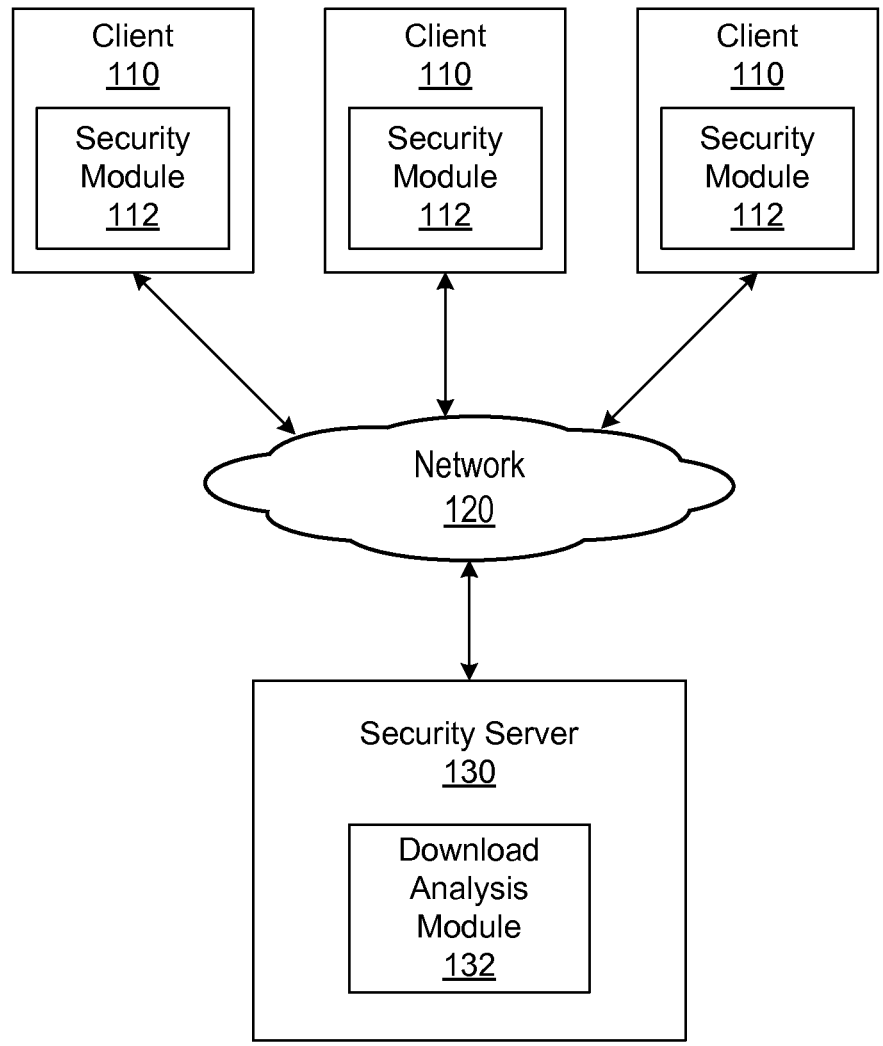
FIG. 1 is a high-level block diagram of a computing environment for detecting and blocking malicious software downloads according to one embodiment.

FIG. 1 is a high-level block diagram of a computing environment 100 for detecting and blocking malicious software (malware) downloads according to one embodiment. FIG. 1 illustrates a security server 130 and three clients 110 connected by a network 120. The illustrated environment 100 represents a typical computing environment where multiple clients 110 interact with the security server 130 to identify and remediate malware at the clients 110. Only three clients 110 are shown in FIG. 1 in order to simplify and clarify the description. Embodiments of the computing environment 100 can have many clients 110 and security servers 130 connected to the network 120.

The client 110 is used by a user to interact with the security server 130 and/or other entities on the network 120. In one embodiment, the client 110 is a personal computer (PC) such as a desktop or notebook computer. In other embodiments, the client 110 is a mobile telephone, personal digital assistant, or other electronic device. For purposes of this description, the term "client" also includes computers such as servers and gateways that encounter software applications or other entities that might constitute malware or other threats. For example, a client 110 can be a network gateway located between an enterprise network and the Internet.

The client 110 executes a security module 112 that blocks downloads of malware to the client 110. The security module 112 monitors file download activities at the client 110 and suspends attempted downloads while it evaluates whether the file being downloaded is malicious. The security module 112 can monitor for downloads of only certain types of files. In one embodiment, the security module 112 specifically monitors for downloads of executable files, such as files in the portable executable (PE) format having the ".EXE" file extension. Other embodiments monitor for other types of executable files, for altogether different file types, or for any type of file download.

Upon detecting a download attempt, the security module 112 gathers data describing the website hosting the file being downloaded. In one embodiment, the hosting website data describe the domain name and Internet Protocol (IP) address of the website hosting the file being downloaded, and may contain additional information such as identifier of the file. The security module 112 reports the hosting website data to the security server 130.

The security module 112 also receives file download control data from the security server 130 and uses these data to either allow or block the download. The file download control data can indicate that the file being downloaded is malware, and therefore the security module 112 blocks the download. The file download control data can also indicate that the file being downloaded is legitimate (i.e., not malware), and therefore the security module 112 allows the download to proceed. The file download control data can further indicate that the file being downloaded might not be malicious but bears special scrutiny, in response to which the security module 112 optionally evaluates the file using malware detection data such as malware signature strings and/or file reputations to determine whether to allow or block the download.

The security server 130 interacts with the clients 110 via the network 120. A download analysis module 132 at the security server 130 receives the hosting website data from a client 110 and uses the data to generate the file download control data it reports to the client 110. Although malware attackers change their hosting website domains constantly, the hosting website domains often resolve to the same IP addresses on the same autonomous systems. Thus, the download analysis module 132 uses the IP address in the hosting website data to determine whether to allow the download.

Specifically, upon receiving a description of an attempted download from the security module 112 of a client 110, an embodiment of the security server 130 interacts with the download analysis module 132 and determines whether the download is from a trusted domain, an unknown domain hosted at an IP address not known to distribute malware, or from a host at an IP address known to distribute malware. The security server 130 responds to the client security module 112 with file download control data based on the determination. One or more of the functions of the security server 130 can also be executed in a cloud computing environment. As used herein, cloud computing refers to a style of computing in which dynamically scalable and often virtualized resources are provided as a service over the Internet.

The network 120 enables communications among the clients 110 and the security server 130 and can comprise the Internet. In one embodiment, the network 120 uses standard communications technologies and/or protocols. Thus, the network 120 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 120 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
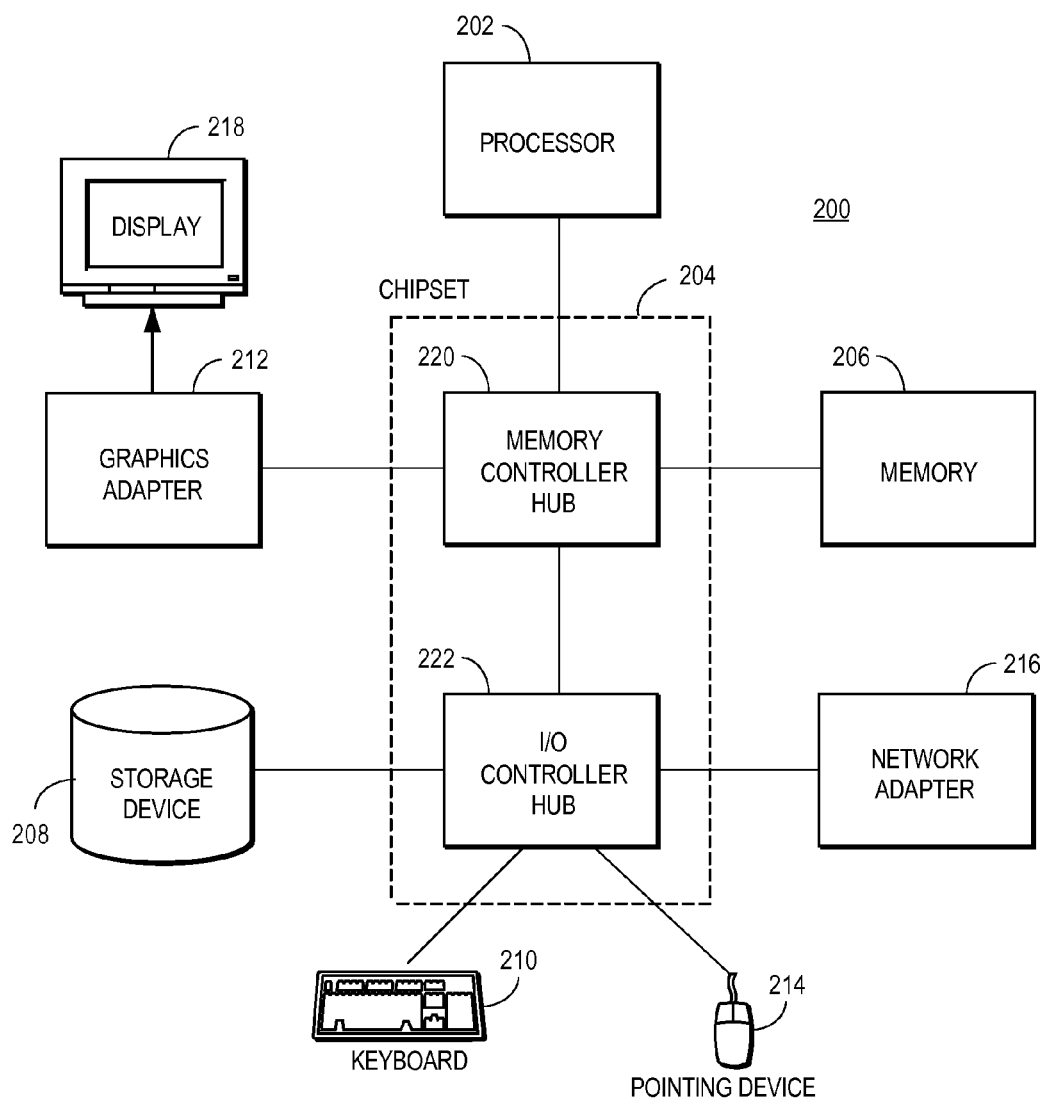
FIG. 2 is a high-level block diagram illustrating a typical computer for use as a security server or a client.

FIG. 2 is a high-level block diagram of a computer 200 for acting as a client 110 and/or as a security server 130. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is a non-transitory computer-readable storage medium, such as a hard drive, compact disk read-only memory (CD-ROM), DVD, or a solid-state memory device and stores files. The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 120.

As is known in the art, a computer 200 can have different and/or other components than those shown in FIG. 2. In addition, the computer 200 can lack certain illustrated components. In one embodiment, a computer 200 acting as a security server 130 can lack a keyboard 210, pointing device 214, graphics adapter 212, and/or display 218. Moreover, the storage device 208 can be local and/or remote from the computer 200 (such as embodied within a storage area network (SAN)).

As is known in the art, the computer 200 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 208, loaded into the memory 206, and executed by the processor 202.

Figure 3:
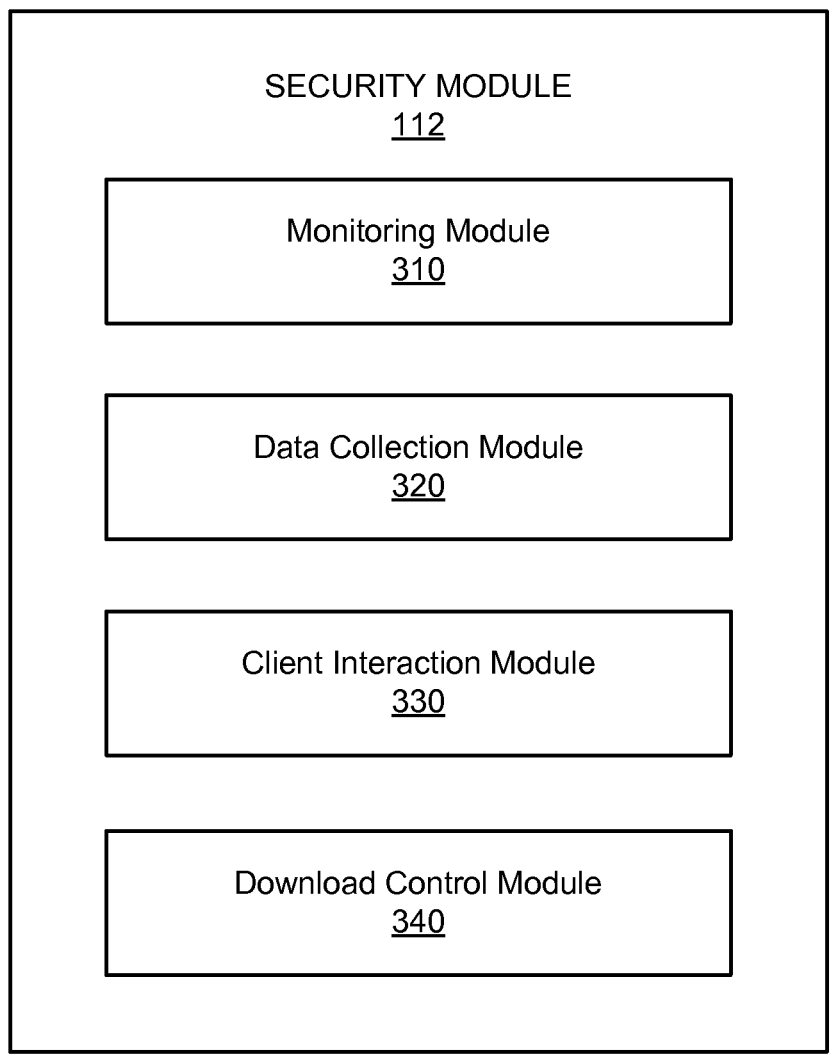
FIG. 3 is a high-level block diagram illustrating a detailed view of a security module of a client according to one embodiment.

FIG. 3 is a high-level block diagram illustrating a detailed view of a security module 112 of a client 110 according to one embodiment. In some embodiments, the security module 112 is incorporated into an operating system executing on the client 110 while in other embodiments the security module 112 is a standalone application or part of another product. As shown in FIG. 3, the security module 112 includes a monitoring module 310, a data collection module 320, a client interaction module 330, and a download control module 340. Those of skill in the art will recognize that other embodiments of the security module 112 can have different and/or other modules than the ones described here, and that the functionalities can be distributed among the modules in a different manner.

The monitoring module 310 monitors file download activity at the client 110 to detect attempted file downloads. The monitoring module 310 can detect file download attempts using a variety of different techniques. In one embodiment, the monitoring module 310 interacts with a web browser executing on the client 110 and detects when the web browser initiates a file download from a website. In another embodiment, the monitoring module 310 monitors network traffic entering and exiting the client 110 and detects traffic indicating an attempted file download using a protocol such as HTTP or FTP.

The monitoring module 310 also suspends detected file download attempts. The monitoring module 310 can suspend a file download by, e.g., preventing an action that initiates the download, blocking network traffic that initiates the download, and/or blocking network traffic carrying the file to the client 110. The monitoring module 310 can also suspend a file download by allowing the download to occur, but then preventing the downloaded file from performing any actions that might harm the client 110. For example, the monitoring module 310 can allow the download of an executable file to occur, but prevent the file from executing. The monitoring module 310 can also redirect the downloaded file to a quarantine or other secure storage area on the storage device 208 of the client 110 where access to the file is restricted. One embodiment of the monitoring module permits the file to be downloaded and scans the file for malware using traditional virus detection techniques, e.g., virus signature scanning and behavioral heuristics.

Responsive to the file to be downloaded not being identified as malware by the monitoring module 310, the data collection module 320 generates hosting website data which identifies the website hosting the file involved in a suspended download. The data collection module 320 generates hosting website data based on the monitoring performed by the monitoring module 310. As mentioned above, in one embodiment the hosting website data describe the domain name and IP address of the website. The data collection module 320 can determine the domain name by, for example, extracting the domain name from the Universal Resource Locator (URL) used by the client 110 to request the file, by capturing the domain name from network traffic requesting the file, and/or by other similar techniques. Similarly, the data collection module 320 can determine the IP address to which the domain name resolves by accessing a domain name system (DNS) server on the network 120, by accessing a hosts file stored at the client 110, and/or via other techniques. In addition, an embodiment of the data collection module 320 collects additional information, such as an identifier of the file to be downloaded, and data describing the client state at the time of the file download event. In one embodiment, the data collection module 320 generates an identifier of the file using, e.g., a hashing algorithm such as a variant of the Secure Hash Algorithm (SHA).

The client interaction module 330 sends reports describing the hosting website data to the security server 130. In one embodiment, a hosting website data report includes the domain name and the IP address of the website hosting the file for which the download was suspended, and an identifier of the file. In one embodiment, the client interaction module 330 sends a report to the security server 130 upon receiving the hosting website data from the data collection module 320. The client interaction module 330 can send the report as part of a request for file download control data from the security server 130. The client interaction module 330 also receives file download control data from the security server 130 in response to such a request.

In one embodiment, the client interaction module 330 sends additional data reports to the security server 130 describing other events occurring at the client 110. In one embodiment, the security module 112 collects data describing malware detected at the client 110. The collected data can include a description of the detected malware, the location from which the malware was downloaded, the state of the client at the time of the attack, and/or other related information.

The download control module 340 uses the file download control data received from the security server 130 to determine whether to block or allow a suspended file download. In one embodiment, if the file download control data indicate that the download is allowed, the download control module 340 interacts with the monitoring module 310 to resume download of the file to the client 110. If the file download control data indicate that the download is blocked, the download control module 340 interacts with the monitoring module 310 to block (i.e., terminate) the download of the file. In other circumstances, such as when the file download control data indicate that the download is allowed but the file should be examined for malware, the download control module 340 optionally interacts with the monitoring module 310 and/or other modules of the security module 112 to perform the appropriate actions. The download control module 340 may continue monitoring behaviors associated with the downloaded file and examine the file using new or updated virus signatures and/or heuristics. The download control module 340 can also take other actions in response to the file download control data. For example, the download control module 340 can notify the user of the client 110 of whether the download was blocked, delete a downloaded file suspended by the monitoring module 310 in response to a malware detection, and/or take other actions to remediate a malicious download.

Figure 4:
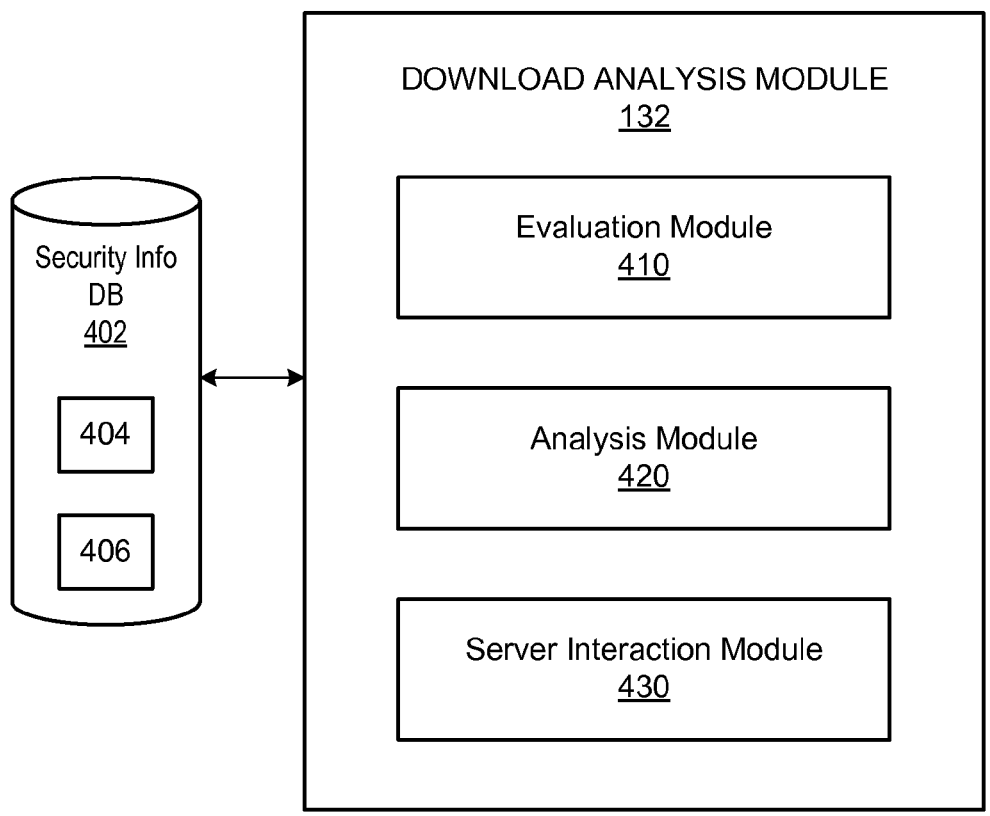
FIG. 4 is a high-level block diagram illustrating a detailed view of a download analysis module of a security server according to one embodiment.

FIG. 4 is a high-level block diagram illustrating a detailed view of the download analysis module 132 of the security server 130 according to one embodiment. The download analysis module 132 receives hosting website data reports from the clients 110 and provides file download control data to the clients 110. As shown in FIG. 4, the download analysis module 132 includes an evaluation module 410, an analysis module 420, and a server interaction module 430. Additionally, the multiple modules of the download analysis module 132 store and/or retrieve data from a security information database 402. Those of skill in the art will recognize that other embodiments of the download analysis module 132 can have different and/or other modules than the ones described here, and that the functionalities can be distributed among the modules in a different manner.

In one embodiment, the security information database 402 stores hosting website data derived from hosting website data reports and other reports received from the clients 110, as well as from other sources. Since there are many clients 110, the security information database 402 stores hosting website data for a wide variety of websites. These data include domain names used by the websites and IP addresses of servers on which the websites are hosted. In addition, the security information database 402 may also store additional data describing the websites, such as whether the websites are operated by known legitimate software distributors and whether the websites are known to have distributed malware.

In particular, an embodiment of the security information database 402 stores a list 404 of trusted domains known to be operated by legitimate software distributors. This list 404 is also referred to as a "trusted publishers list" because the software publishers on the list are known to distribute files free of malware. The list 404 of trusted domains specifies the publishers' domain names and can also include related information such as corresponding IP addresses. The list 404 of trusted domains can be established via automated and/or manual processes. For example, an operator of the security server 130 can manually add trusted domains to the list 404. Likewise, the download analysis module 132 and/or other modules at the security server 130 can add trusted domain names to the list 404 based on data observed about the domain names in reports received from the clients 110 and/or from other sources. For example, the security server 130 can add a domain name to the trusted domains list 404 upon receiving reports from clients 110 indicating that files downloaded from the domain name are not malicious.

The security information database 402 also stores a list 406 of IP addresses of hosts known to distribute malware. As described above, attackers constantly change domains of websites used to distribute malware. However, the different domains often resolve to hosts within a limited set of IP addresses. Accordingly, the IP addresses can be used to reliably identify websites distributing malware. In one embodiment, an IP address is added to the list 406 of IP addresses of hosts known to distribute malware if it is associated with more than a threshold number of malware attacks against the clients 110 within a given time period. Thus, if the reports from the clients 110 indicate that numerous malware attacks originated from a given IP address within a given time period, that IP address is added to the list 406. Due to its nature, this list 406 is also referred to as the "repeat-offender list." In one embodiment, the repeat-offender list 406 is generated automatically by the download analysis module 132 and/or other modules at the security server 130 based on reports received from the clients 110 and/or from other sources. The repeat-offender list 406 is updated frequently as new IP addresses are discovered and new attacks are reported.

In some embodiments, the security information database 402 also stores additional information. For example, the database 402 can store reputation information for files, clients 110, websites, and/or other entities. The reputation information can include information provided by the clients 110, by the entity that operates the security server 130, and/or by other sources. The reputation information can describe characteristics of files and include, for example, information indicating a number of clients 110 on which a file is downloaded, frequencies at which a file is installed and uninstalled on clients 110, information regarding any known degradations to system performance associated with a file, the dates on which file was downloaded on the clients 110, and the parties associated with the manufacture or development of the files. Other embodiments of the security information database 402 store different and/or additional information, such as reputation scores computed from the reputation information.

Turning now to the modules within the download analysis module 132, the evaluation module 410 receives requests for file download control data from the clients 110 and generates the requested data. As mentioned above, a request for file download control data can include a hosting website data report that identifies the domain name and IP address of a website from which the requesting client is downloading the file. The evaluation module 410 evaluates the hosting website data report, determines whether to allow or block the download, and generates file download control data based on the determination.

In one embodiment, upon receiving a request for file download control data, the evaluation module 410 determines whether the domain name in the corresponding hosting website data report is listed on the trusted publishers list 404. If the domain name is trusted, then the client 110 is attempting to download a file from a website at a trusted domain. Therefore, the evaluation module 410 generates file download control data indicating that the download is allowed.

An embodiment of the evaluation module 410 can also determine whether the IP address in the hosting website data report is listed on the repeat-offender list 406. If the IP address is on the repeat-offender list 406, then the client 110 is attempting to download a file from a website hosted at an IP address known to be associated with malware distribution. Therefore, the evaluation module 410 generates file download control data indicating that the download is blocked.

If the domain is not on the trusted publishers list 404, and the IP address is not on the repeat-offender list 406, then different embodiments of the evaluation perform different actions. One an embodiment of the evaluation module 410 uses the analysis module 420 to analyze the file to determine whether to block download of the file. The analysis module 420 uses the identifier of the file included in the hosting website data report to obtain information about the file from the security information database 402. For example, the analysis module 420 can determine a reputation score indicating a likelihood that the file contains malware. If the reputation score or other analysis by the analysis module 420 indicates that the file is likely not malware, the evaluation module 410 generates file download control data indicating that the download is allowed. In contrast, if the reputation score or other analysis by the analysis module 420 indicates that the file is likely malware, the evaluation module 410 generates file download control data indicating that the download is blocked. Another embodiment of the evaluation module 410 generates download control data flagging the file for scrutiny by the client security module 112 if the domain is not on the trusted publishers list 404 and the IP address is not on the repeat-offender list 406. The client security module 112 can then use reputation and/or other techniques to determine whether to download the file to the client 110.

The server interaction module 430 interacts with the security modules 112 of the clients 110 to provide the file download control data. The server interaction module 430 can also provide additional information, such as reputations of files, websites, and other entities, and signatures and heuristics that can be used by the security modules 112 to detect malware at the clients 110.

Figure 5:
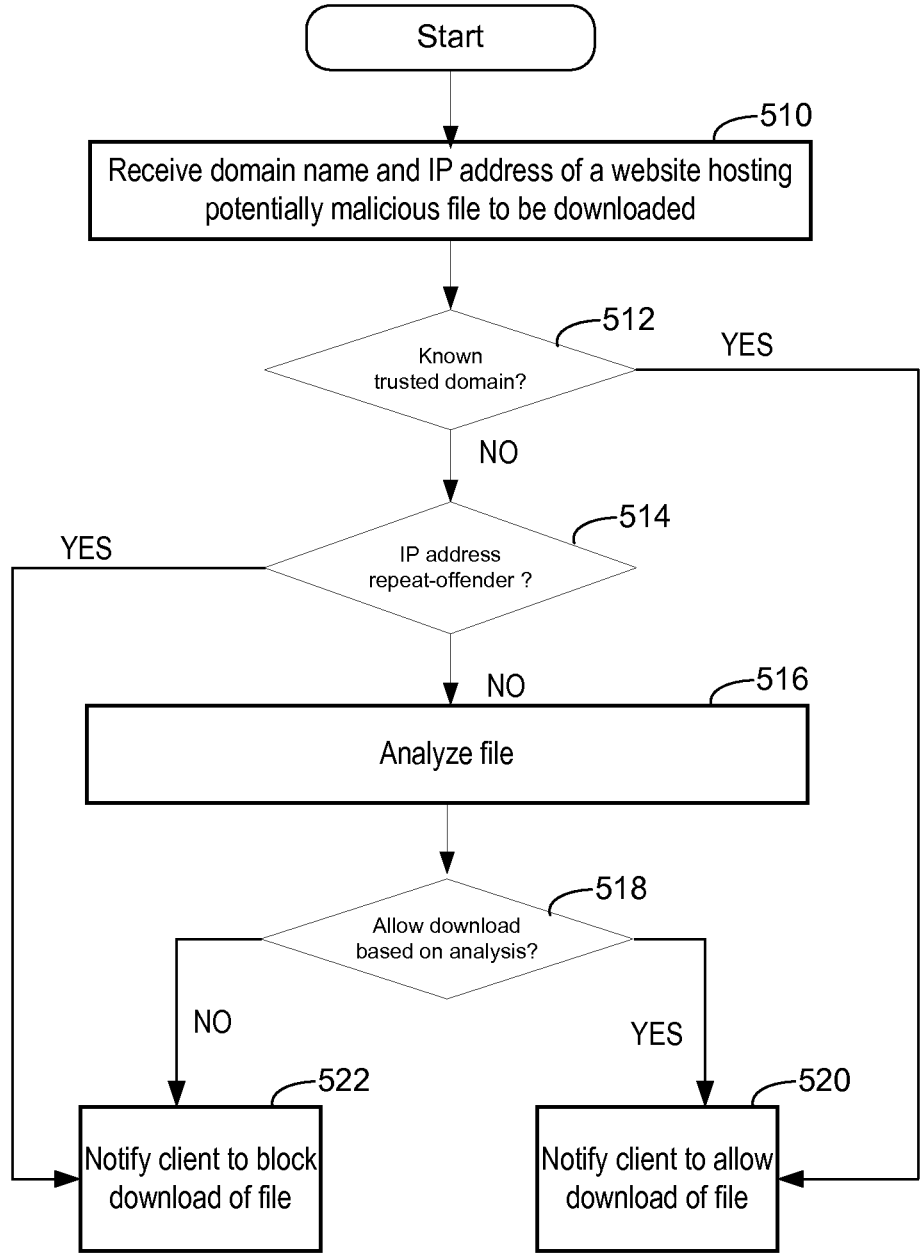
FIG. 5 is a flowchart illustrating steps performed by the download analysis module according to one embodiment.

FIG. 5 is a flowchart illustrating steps performed by the download analysis module 132 to generate and report file download control data according to one embodiment. Other embodiments perform the illustrated steps in different orders, and/or perform different or additional steps. Moreover, some of the steps can be performed by engines or modules other than the download analysis module 132.

Initially, the download analysis module 132 receives 510 a hosting website data report from a client 110. The report identifies a domain name and an IP address of a website hosting a file that the client 110 is attempting to download. The download analysis module 132 evaluates 512 the domain name to determine whether the domain is trusted. If the domain is on a list 404 of trusted publishers' domains, the download analysis module 132 generates file download control data indicating that downloading the file is allowed and provides the data to the client 110. The download analysis module 132 thus notifies 520 the client 110 to allow downloading of the file.

If the domain of the hosting website is not on the trusted publishers list 404, the download analysis module 132 determines 514 whether the IP address of the hosting website is on a list 406 of repeat-offender IP addresses. If the IP address is on the repeat-offender list 406, the download analysis module 132 generates file download control data indicating that downloading the file is blocked and provides the data to the client 110. The download analysis module 132 thus notifies 522 the client 110 to block downloading of the file.

If the domain of the hosting website has an IP address not found on the list 406 of repeat-offender IP addresses, the download analysis module 132 can either notify the client to block 522 the file download or to allow 520 the file download. Optionally, the download analysis module 132 flags the file for further analysis based on, e.g., reputation. Depending upon the embodiment, the analysis 516 can be performed by the download analysis module 132 and/or by the security module 112 of the client 110. If the analysis is performed by the download analysis module 132, the analysis module notifies the client 110 of whether to allow 520 or block 522 the download based on the result of the analysis. If the analysis is performed by the security module 112 of the client 110, then the client ultimately determines whether to allow or block the download.

Thus, the techniques described above exploit the fact that malware attackers tend to use multiple domain names that ultimately resolve to the same limited set of IP addresses to prevent malware downloads by clients 110. Downloads from domains of trusted publishers are allowed to proceed. Downloads from unrecognized domains (i.e., non-trusted domains) that are not hosted at repeat-offender IP addresses are subject to scrutiny, and permitted if further analysis shows that the downloads are not malware. However, downloads from unrecognized domains that resolve to repeat-offender IP addresses are blocked. There is a risk of a false positive malware detection (i.e., an improper download block) if a legitimate software publisher uses an unrecognized domain that happens to resolve to a repeat-offender IP address. However, such false positives can be mitigated by, e.g., adding the domain to the trusted publishers list.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method for blocking a download of malicious software (malware), the method comprising:

using one or more computer processors to perform:
receiving a hosting website data report, the hosting website data report describing a domain name and an Internet Protocol (IP) address of a website hosting a file a client is attempting to download;
determining whether the domain name of the web site is on a list of trusted domains, and generating file download control data indicating to allow downloading of the file responsive to determining the domain name of the website is on the list of trusted domains;
responsive to determining the domain name of the website being not on the list of trusted domains, determining whether the IP address of the web site is on a list of IP addresses from which clients have downloaded malware, wherein the list of IP addresses from which clients have downloaded malware lists IP addresses from which more than a threshold number of malware downloads to clients have been detected within a given time period;
responsive to determining the domain name of the website being not on the list of trusted domains and the IP address of the website being not on the list of IP addresses from which clients have downloaded malware, using a file identifier to determine a file reputation score for the file by obtaining information about the file from a database, the information about the file describing characteristics of the file for determining the file reputation score, the file reputation score indicating whether the file likely contains malware;
responsive to the file reputation score indicating the file likely containing malware, generating file download control data indicating to block downloading of the file; and
reporting the file download control data to the client, wherein the client is adapted to use the file download control data to selectively block downloading of the file.

2. The method of claim 1, wherein trusted domain names are added to the list of trusted domains responsive to data observed about the domain names in hosting website data reports received from a plurality of clients.

3. The method of claim 1, wherein the client is further adapted to examine the file for malware responsive to receiving the file download control data indicating to download the file.

4. A non-transitory computer-readable storage medium storing executable computer program instructions for blocking a download of malicious software (malware), the computer program instructions comprising instructions for:

receiving a hosting website data report, the hosting website data report describing a domain name and an Internet Protocol (IP) address of a website hosting a file a client is attempting to download;
determining whether the domain name of the website is on a list of trusted domains, and generating file download control data indicating to allow downloading of the file responsive to determining the domain name of the website is on the list of trusted domains;

responsive to determining the domain name of the website being not on the list of trusted domains, determining whether the IP address of the website is on a list of IP addresses from which clients have downloaded malware, wherein the list of IP addresses from which clients have downloaded malware lists IP addresses from which more than a threshold number of malware downloads to clients have been detected within a given time period;

responsive to determining the domain name of the website being not on the list of trusted domains and the IP address of the website being not on the list of IP addresses from which clients have downloaded malware, using a file identifier to determine a file reputation score for the file by obtaining information about the file from a database, the information about the file describing characteristics of the file for determining the file reputation score, the file reputation score indicating whether the file likely contains malware;

responsive to the file reputation score indicating the file likely containing malware, generating file download control data indicating to block downloading of the file; and reporting the file download control data to the client, wherein the client is adapted to use the file download control data to selectively block downloading of the file.

5. The computer-readable storage medium of claim 4, wherein trusted domains are added to the list of trusted domains responsive to data observed about the domain names in hosting website data reports received from a plurality of clients.

6. The computer-readable storage medium of claim 4, wherein the client is further adapted to examine the file for malware responsive to receiving the file download control data indicating to download the file.

7. A system for blocking a download of malicious software (malware) comprising:
a non-transitory computer-readable storage medium storing executable computer program modules comprising:
an evaluation module for receiving a hosting website data report, the hosting website data report describing a domain name and an Internet Protocol (IP) address of a website hosting a file a client is attempting to download;

the evaluation module further for:
determining whether the domain name of the website is on a list of trusted domains, and generating file download control data indicating to allow downloading of the file responsive to determining the domain name of the website is on the list of trusted domains;

responsive to determining the domain name of the website being not on the list of trusted domains, determining whether the IP address of the website is on a list of IP addresses from which clients have downloaded malware, wherein the list of IP addresses from which clients have downloaded malware lists IP addresses from which more than a threshold number of malware downloads to clients have been detected within a given time period;

responsive to determining the domain name of the website being not on the list of trusted domains and the IP address of the website being not on the list of IP addresses from which clients have downloaded malware, using a file identifier to determine a file reputation score for the file by obtaining information about the file from a database, the information about the file describing characteristics of the file for determining the file reputation score, the file reputation score indicating whether the file likely contains malware; and responsive to the file reputation score indicating the file likely containing malware, generating file download control data indicating to block downloading of the file;

a server interaction module for reporting the file download control data to the client, wherein the client is adapted to use the file download control data to selectively block downloading of the file; and a processor for executing the computer program modules.

8. The system of claim 7, wherein trusted domains are added to the list of trusted domains responsive to data observed about the domain names in hosting website data.

9. The system of claim 7, wherein the client is further adapted to examine the file for malware responsive to receiving the file download control data indicating to download the file.

* * * * *